US 6,688,349 B2

(12) United States Patent
Roshilavati Razlan et al.

(10) Patent No.: US 6,688,349 B2
(45) Date of Patent: Feb. 10, 2004

(54) HAND PLANING MACHINE

(75) Inventors: Shila Roshilavati Razlan, Penang (MY); Juergen Gairing, Stuttgart (DE); Juergen Stoeger, Neckartailfingen (DE); Marco Braun, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/231,624

(22) Filed: Aug. 30, 2002

(65) Prior Publication Data

US 2003/0168122 A1 Sep. 11, 2003

(30) Foreign Application Priority Data

Mar. 8, 2002 (DE) ....................... 202 03 683 U

(51) Int. Cl.⁷ ................................. B27C 1/10
(52) U.S. Cl. .................. 144/154.5; 144/117.4; 144/252.1; 451/355; 451/451; 30/475; D8/62
(58) Field of Search ............... D8/61, 62; 30/475–477, 30/382, 124; 144/114.1, 117.1, 154.5, 252.1, 117.4; 451/355, 451

(56) References Cited

U.S. PATENT DOCUMENTS

| 3,474,575 | A | * | 10/1969 | Beckering et al. | .......... 451/355 |
| 5,094,000 | A | * | 3/1992 | Becht et al. | .................. 30/475 |
| 5,383,275 | A | * | 1/1995 | Hild et al. | ..................... 30/475 |
| 5,815,934 | A | * | 10/1998 | Eichberger et al. | .. 144/252.1 X |
| D475,594 | S | * | 1/2003 | Bian | ............................ D8/62 |

FOREIGN PATENT DOCUMENTS

DE    197 13 845 A1    10/1998

* cited by examiner

*Primary Examiner*—W. Donald Bray
(74) *Attorney, Agent, or Firm*—Michael J. Striker

(57) ABSTRACT

A hand planing machine has a housing composed of a plurality of shells tightly connected with one another, a planing shaft, a motor for driving the planing shaft, means forming a chip withdrawing opening, the motor and the chip withdrawing opening being arranged axes-parallel to one another and extending outwardly at a same side, the shells including a single cover shell which simultaneously surrounds the motor and the chip withdrawing opening and forms a lateral outer surface of the housing.

12 Claims, 6 Drawing Sheets

HAND PLANING MACHINE

BACKGROUND OF THE INVENTION

The present invention relates to a hand planing machine.

Hand planing machines or hand grinding machines are known, in which a housing is composed of horizontal or vertical shells placed over one another, for simplification of mounting. German document DE 197 13 845 discloses such a hand planer, which has a housing composed of shells vertically placed over one another. The cover shell which is located outside and overlaps the motor in a cup shaped manner, is plate-shaped, relatively flat and overlaps the motor. Thereby the neighboring inner shell of the housing which has a chip withdrawing opening is designed very complicated and is expensive to manufacture.

SUMMARY OF THE INVENTION

Accordingly, it is an object of the present invention to provide a hand planing machine, which eliminates the disadvantages of the prior art.

In keeping with these objects and with others which will become apparent hereinafter, one feature of the present invention resides, briefly stated in a hand planing machine, comprising a housing composed of a plurality of shells tightly connected with one another; a planing shaft; a motor for driving said planing shaft; means forming a chip withdrawing opening, said motor and said chip withdrawing opening being arranged axes-parallel to one another and extending outwardly at a same side, said shells including a single cover shell which simultaneously surrounds said motor and said chip withdrawing opening and forms a lateral outer surface of said housing.

When the hand planing machine is designed in accordance with the present invention, it has a housing which is simpler to produce and less expensive than in the known hand planing machines, since due to the design of the cover shell, the neighboring housing shell which carries the motor and the chip withdrawing opening can be designed simpler.

The cover shell can be placed tightly on the neighboring shell in a releasable manner. Therefore dust and moisture is prevented at the location between the cover shell and the neighboring shell.

The cover shell can be elongated and can be provided with two cup-shaped curved regions which are connected by a substantially plane web, which regions overlap the motor and the chip withdrawing opening. Thereby the cover shell has a relatively stabile profile which significantly contributes to robustness of housing.

The cover shell in the region covering the motor can be provided with two carbon brush holders which are screwed in their working position. The housing therefore is especially service-friendly, and an exchange of the carbon brush holders is possible in a simple and fast manner.

The cover shell in the region which covers the motor can be provided with two opposite inner threads for receiving the carbon brush holders, and one partial thread is provided in a slot, in particular a partial inner thread. Therefore, the cover shell can be dismounted especially simple without releasing the mounted carbon brush.

The curved region of the cover shell is tubulor over the suction opening and is pluggable with a dust suction tube. Therefore, chips produced during planing are reliably aspirated without reaching the surrounding air. The cover shell has a wedge which arrests and grips in the neighboring shell. Therefore, the cover shell is held on the neighboring shell in especially secure manner. The wedge has a dovetail shape and is held in a corresponding groove in a pluggable and releasable way. As a result the cover shell is fixed non-releasably on the neighboring shell.

The wedge serves for pressing the cable into the interior of the housing, so that the cable is secured in especially reliable way against unintentional release from the plug contacts. The cover shell can have at least two, in particular three screw domes for secure connection of the cover shell to the housing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
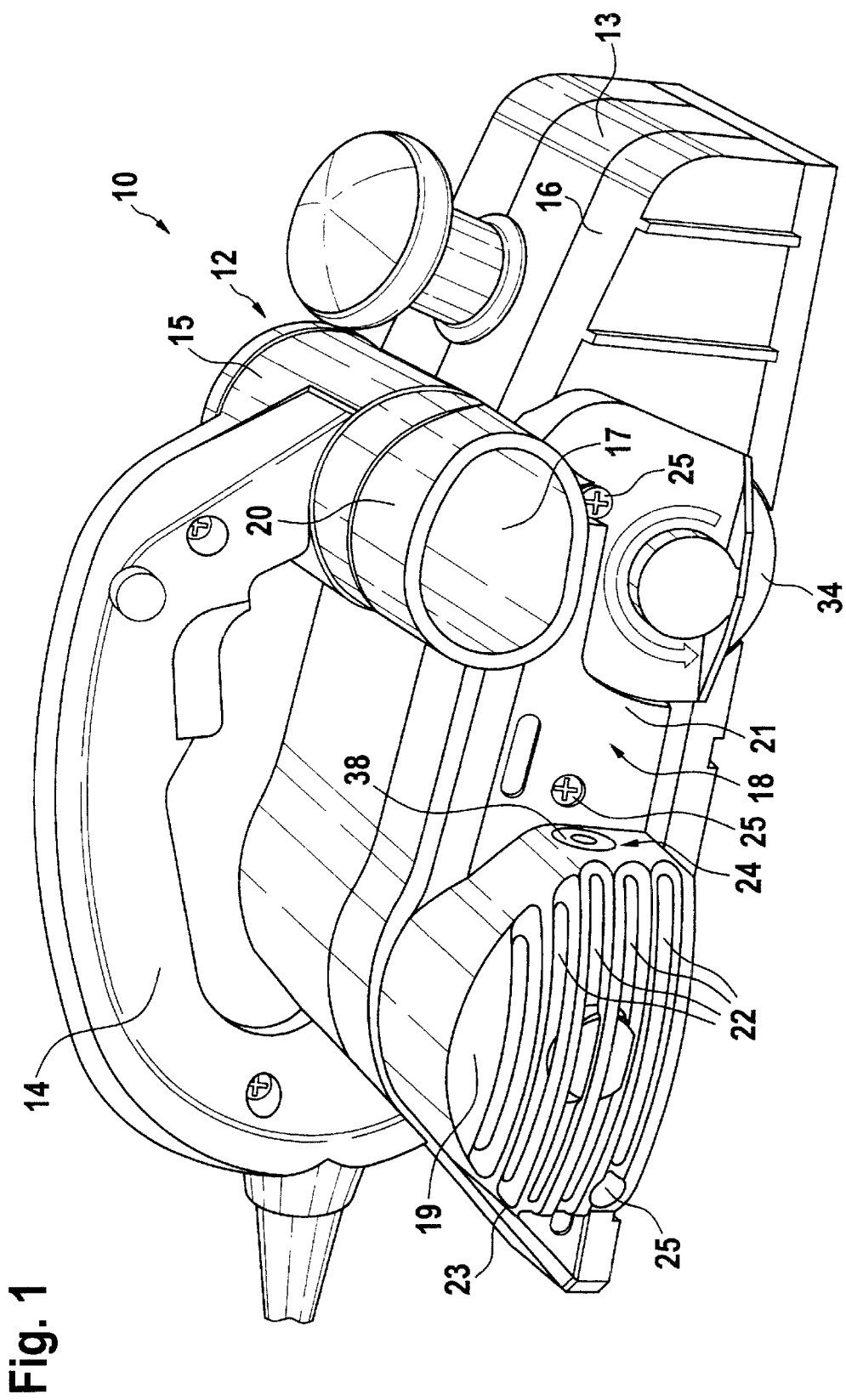
FIG. 1 is a perspective side view of a hand planing machine from a front right side.

A hand planner 10 in accordance with the present invention has a housing 2 with an upper handle 14 which is mounted on a housing central shell 13. The hand planning machine in its front region carries a not shown, upwardly extending auxiliary handle.

The housing 12 is composed of a left outer shell 15 which is flanged together with a right outer shell 16. A cover shell 18 which forms a laterally outer surface is screwed on it. It has a chip withdrawing opening 17 and overlaps a curvature of a not shown motor with a cup-shaped motor dome 19 extending in the same direction. The motor dome 19 is connected with a cup-shaped chip opening dome 20 through a substantially flat web 21 and forms the cover shell 18.

The motor dome 19 has outer ventilation slots 22. The cooling air can be supplied through the ventilating slots 22 to the motor for cooling purposes.

The cover shell moreover is provided with screw openings 23, 24 which extend radially to the axis of the motor dome 19. They are provided for screwing-in of carbon brush holders which contact the motor in a collector region.

The cover shell 18 also has lateral screw openings 25. Mounting screws extend through the screw opening 25 and fix the cover shell 18 to the neighboring right outer shell 16. It should be noted that the axis of the chip opening dome and the motor dome 19 extend substantially parallel to one another.

Figure 2:
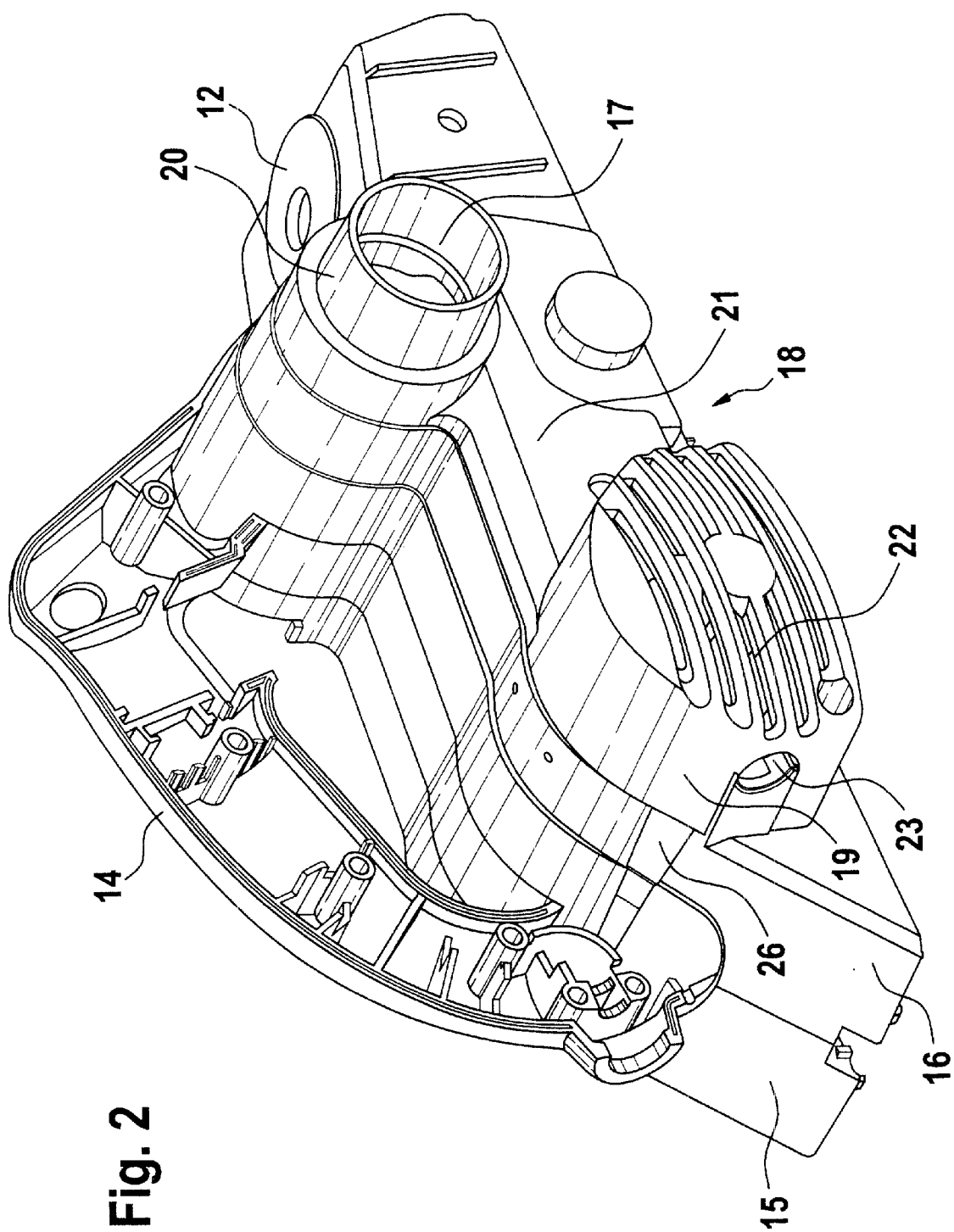
FIG. 2 is a side view of a housing with a cover shell of the inventive planning machine.

FIG. 2 shows a view inclinedly from behind of the housing 12, which clearly illustrates left and right outer shells 15, 16. Moreover, the rear screw opening 23 and the ventilation slots 22 are shown in this Figure. Also, the web 22 which is located under the highest raised portions of the motor dome 19 and the chip opening dome 20 can be clearly seen from this drawing.

Figure 3:
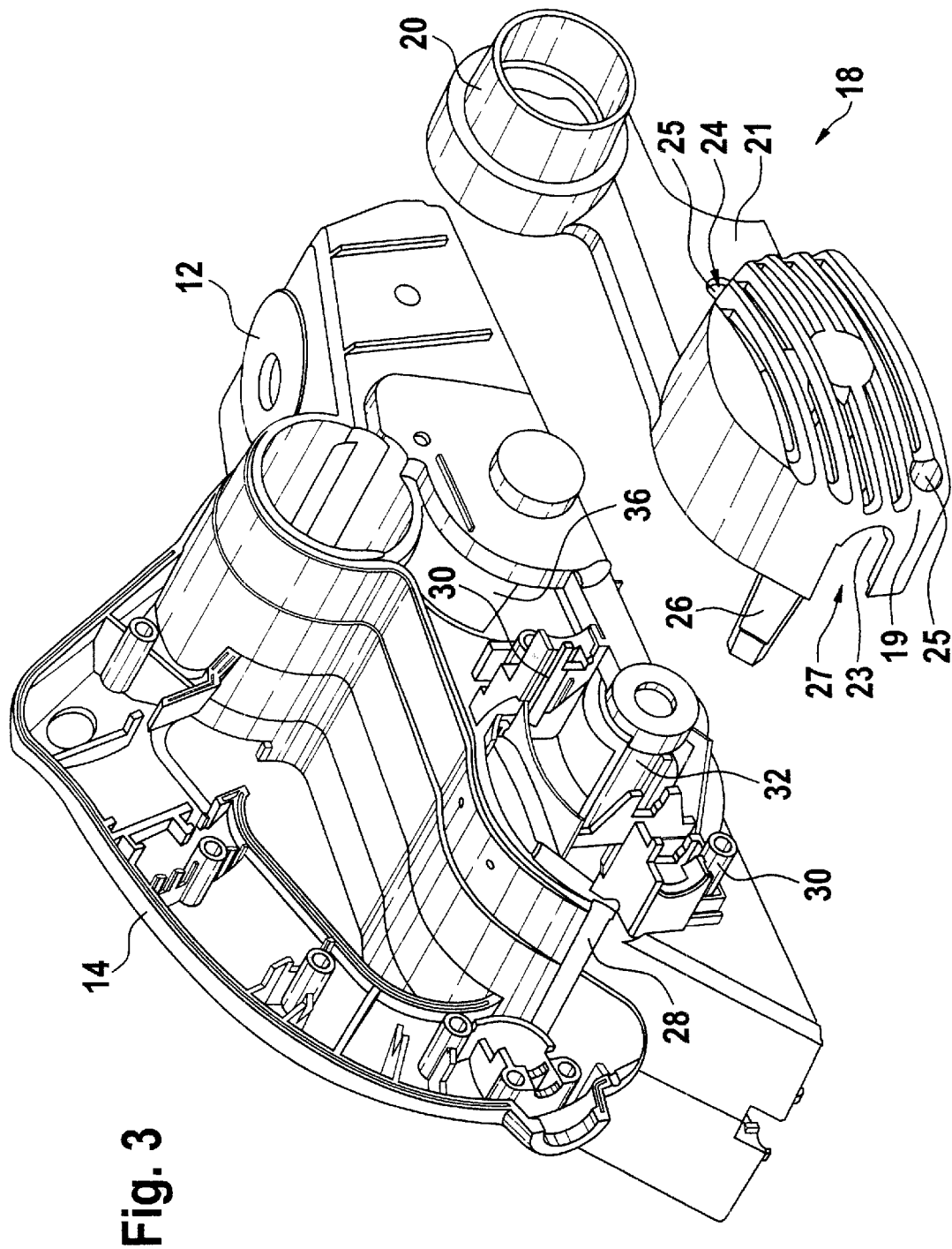
FIG. 3 is a side view of the housing from a right side with an axially withdrawn cover shell.

FIG. 3 illustrates the design of the cover shell 18. The course of the dovetail-shaped wedge 26 extends clearly over the abutment surface between the cover shell 18 and the neighboring right outer shell 16. Furthermore, the rear screw opening 23 is provided in the edge of the open slot 27 and engages a projection of the neighboring right housing shell 16, which in turn carries a part of the thread for receiving a carbon brush holder 38. The front screw opening 24 is arranged on the diametrically opposite side of the screw opening 23. It is also designed as a slot as the rear screw opening 23.

The explosion view of FIG. 1 clearly shows the web 21 which connects the motor dome 19 and the cup-shaped chip opening dome 20 with one another. It laterally covers an inner passage 36 in form of a shell. Air passes through the air passage 36 for withdrawal of planning chips.

Figure 4:
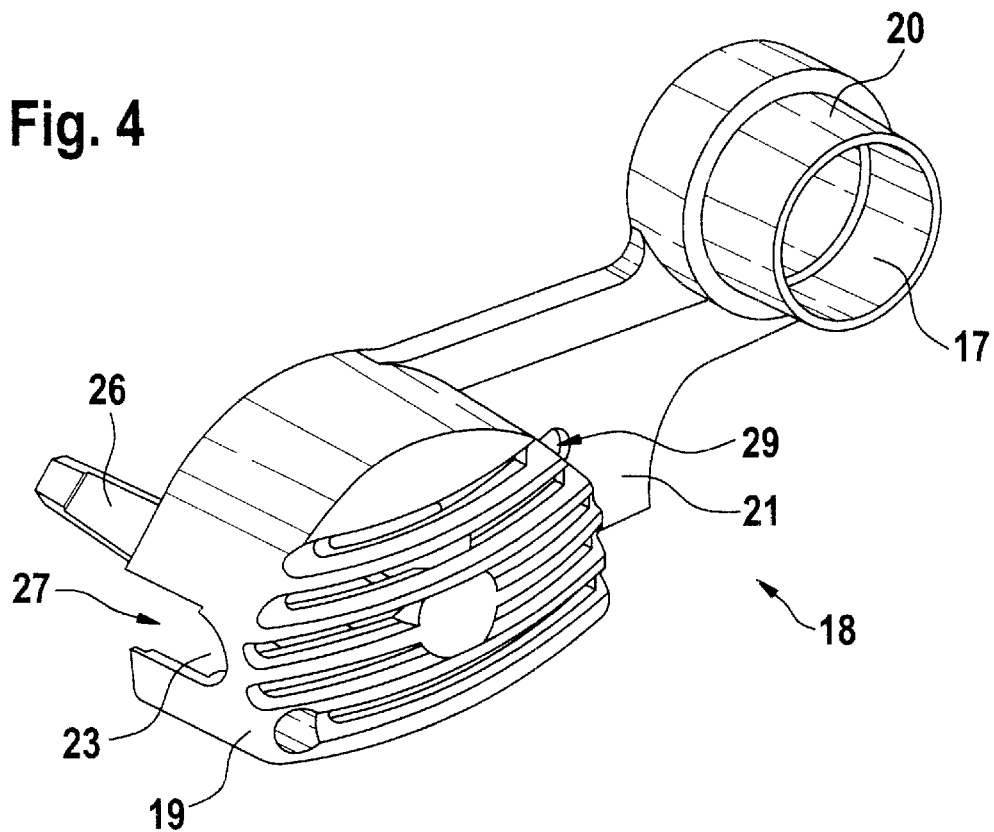
FIG. 4 is a perspective view of the cover shelf, in inclined position from behind, of the inventive hand planing machine.

FIG. 4 shows the details of the cover disc 18. The design of the motor dome 20 and the chip opening dome 19 is also clearly shown in this drawing, in particular the design of the screw opening 23 as an open slot 27.

The chip opening dome 20 is formed as a tubular pipe. A dust suction pipe can be inserted and held in it securely from loosening.

Figure 5:
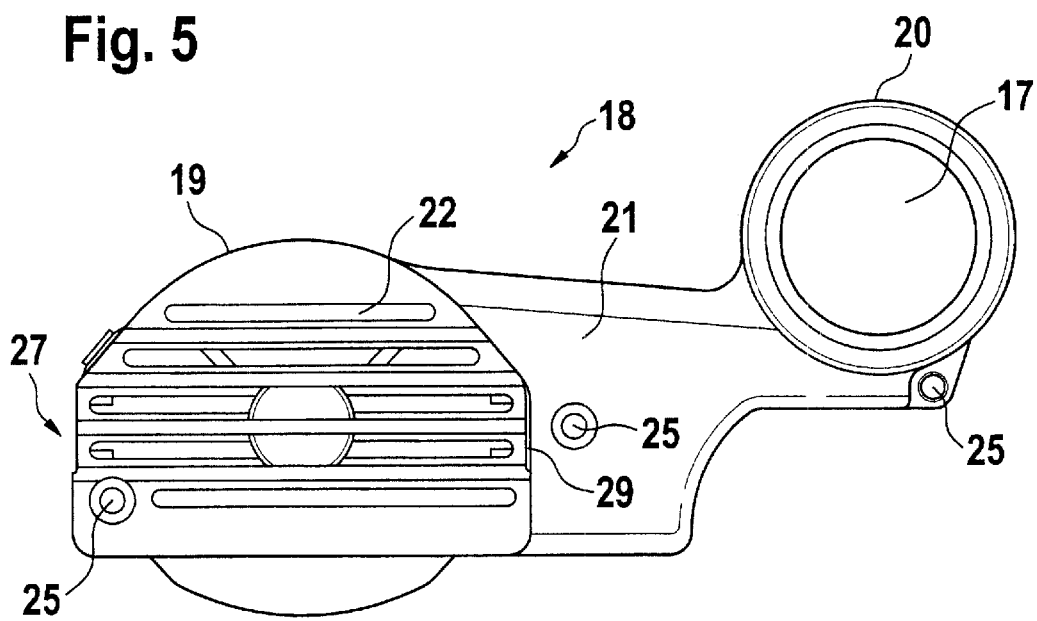
FIG. 5 is a plan view on a side surface of the cover shell of the inventive planing machine.
Figure 6:
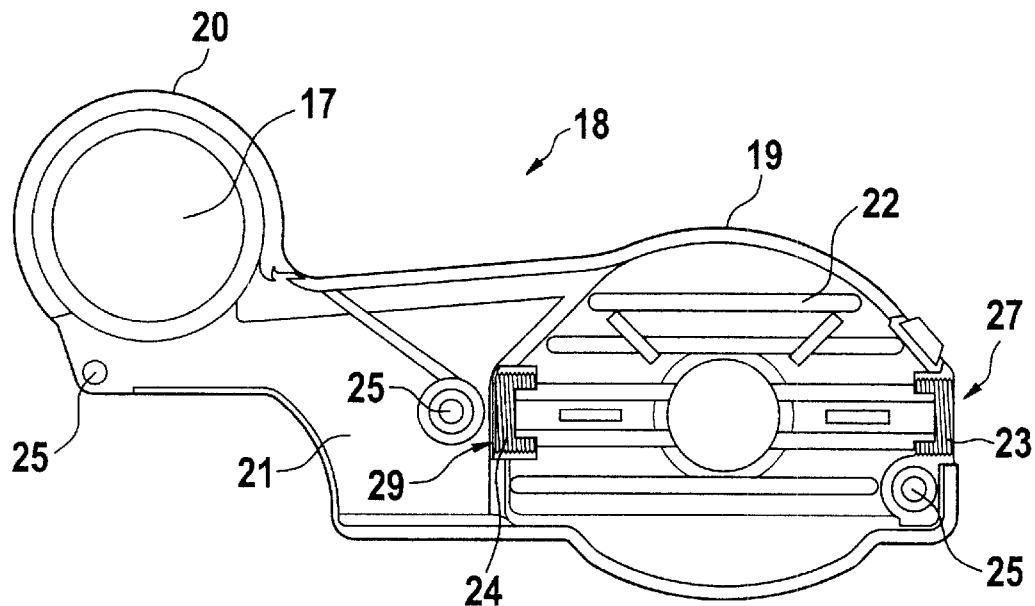
FIG. 6 is a plan view on an inner surface of the cover shell of the inventive planing machine.

FIGS. 5 and 6 clearly show the inner and outer side of the cover shell 18, without repeating the individual elements. The screw openings 23, 24 for the carbon brush holder 38 carry only a partial thread and are designed as slots 27, 29.

Figure 7:
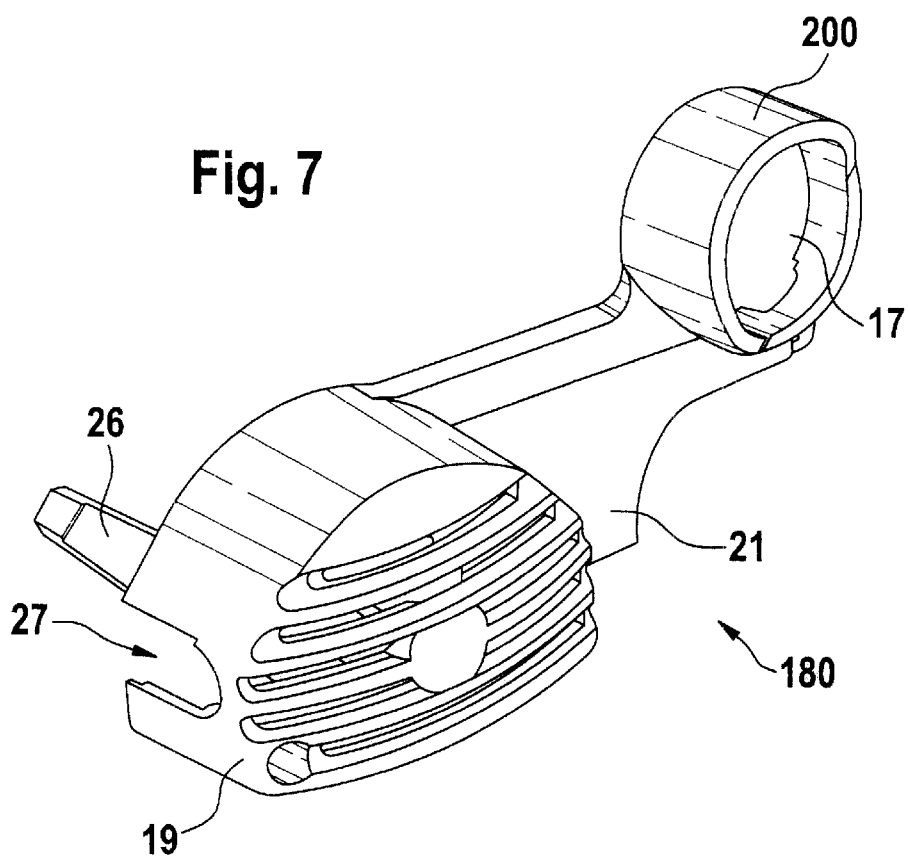
FIG. 7 is a spacial view inclined from below of a further embodiment of a cover shell of the inventive cleaning machine.
Figure 8:
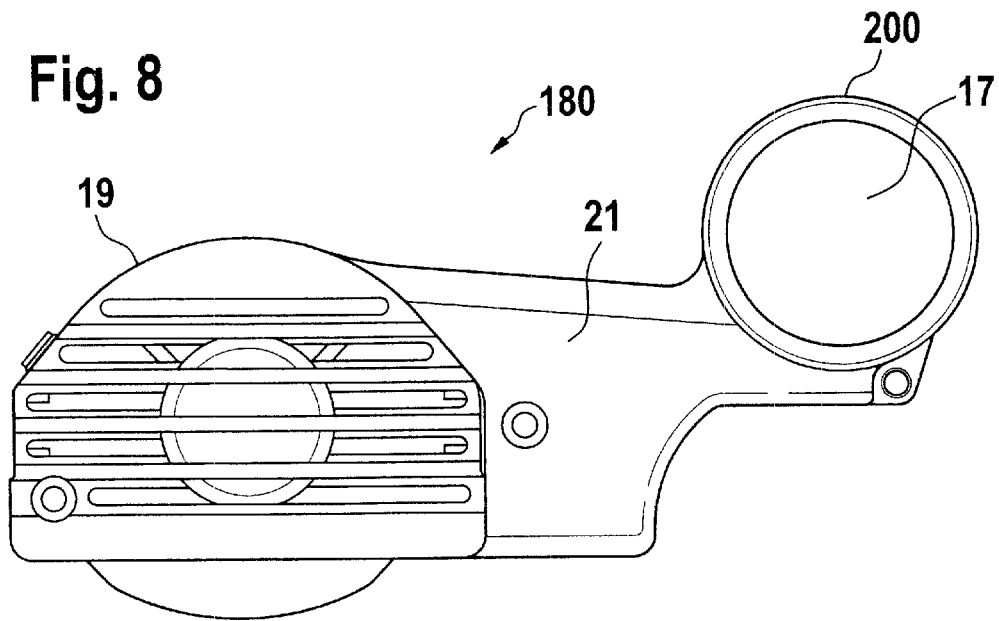
FIG. 8 is a plan view on an outer side of the cover shell of the inventive planning machine of FIG. 7.
Figure 9:
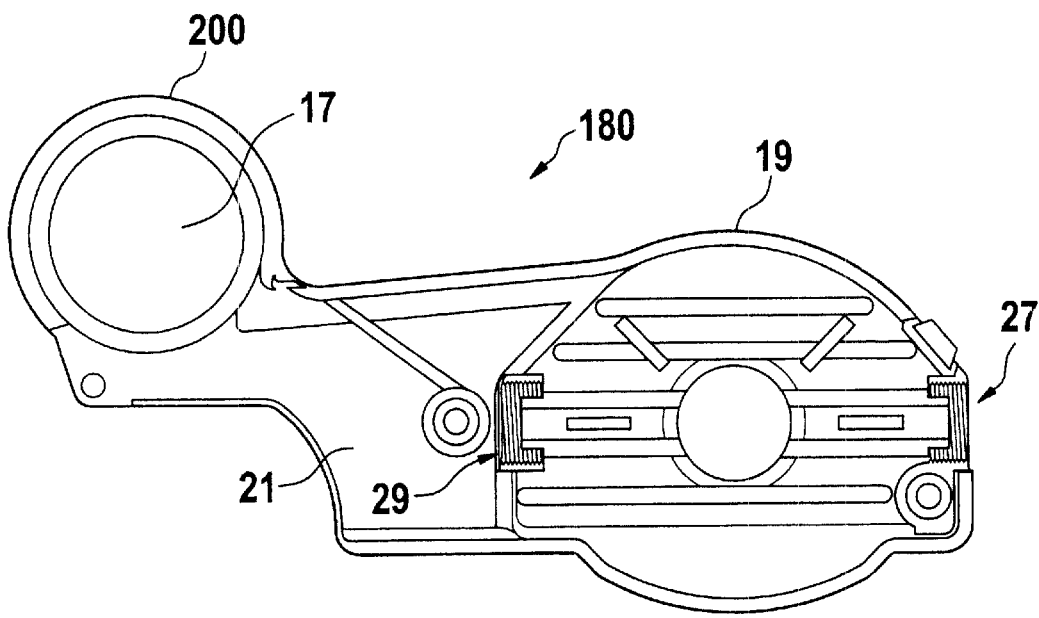
FIG. 9 is an inner view of the shell of FIG. 8 of the inventive planning machine.

FIGS. 7, 8 and 9 show a cover disc 180 which is somewhat different from the design of the cover disc 18 only by an axially shorter chip opening dome 200 which surrounds the chip opening 17. In other aspects, the design of the cover shell 180 is identical to the design of the cover shell 18 shown in the previous figures.

It will be understood that each of the elements described above, or two or more together, may also find a useful application in other types of constructions differing from the types described above.

While the invention has been illustrated and described as embodied in hand planing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand planing machine, comprising a housing composed of a plurality of shells tightly connected with one another; a planing shaft; a motor for driving said planing shaft; means forming a chip withdrawing opening, said motor and said chip withdrawing opening having axes which are parallel to one another and extending outwardly at a same side, said shells including a single cover shell which simultaneously surrounds said motor and said chip withdrawing opening and forms a lateral outer surface of said housing.

2. A hand planing machine as defined in claim 1, wherein said shells includes a shell which is located next to said cover shell, said shell and said neighboring shell being placed over one another and releasably connected with one another.

3. A hand planing machine as defined in claim 1, wherein said cover shell is elongated and has two cup-shaped curved regions which are connected with one another by a substantially flat web, said regions surrounding said motor and said chip withdrawing opening.

4. A hand planing machine as defined in claim 1, wherein said cover shell has a region which covers the motor and is provided in said region with two carbon brush holders which are screwable in said cover shell in a working position.

5. A hand planing machine as defined in claim 1, wherein said cover shell in a region which covers said motor has two opposite inner threads for receiving carbon brush holders, one of said regions having a partial thread provided in a slot.

6. A hand planing machine as defined in claim 1, wherein one of said curved regions is tubular over said chip withdrawing opening and plug-connectable with a dust suction pipe.

7. A hand planing machine as defined in claim 2, wherein said cover shell is provided with an edge which arrestingly engages in said neighboring shell for a reliable positioning and holding of said cover shell.

8. A hand planing machine as defined in claim 7, wherein said wedge has a dovetail shape and is held pluggably and releasably in a corresponding groove.

9. A hand planing machine as defined in claim 2, wherein said wedge is formed for placing a cable in an interior of said housing in said neighboring housing shell.

10. A hand planing machine as defined in claim 1, wherein said cover shell is provided with at least two screw domes.

11. A hand planing machine as defined in claim 1, wherein said cover shell is provided with said two screw domes.

12. A hand planing machine as defined in claim 1, wherein said cover shell has a ventilation slot for entering a motor cooling air and an mouth of said chip withdrawing opening.

* * * * *